(12) United States Patent
Chandankar et al.

(10) Patent No.: US 11,847,820 B2
(45) Date of Patent: Dec. 19, 2023

(54) METHOD AND SYSTEM FOR CLASSIFYING FACES OF BOUNDARY REPRESENTATION (B-REP) MODELS USING ARTIFICIAL INTELLIGENCE

(71) Applicant: HCL Technologies Limited, New Delhi (IN)

(72) Inventors: Girish Ramesh Chandankar, Mumbai (IN); Hari Krishnan Elumalai, Chennai (IN); Pankaj Gupta, Mumbai (IN); Rajesh Chakravarty, Mumbai (IN); Akash Agarwal, Pune (IN); Raunaq Pandya, Mumbai (IN); Yaganti Sasidhar Reddy, Mumbai (IN)

(73) Assignee: HCL Technologies Limited, Delhi (IN)

( * ) Notice: Subject to any disclaimer, the term of this patent is extended or adjusted under 35 U.S.C. 154(b) by 72 days.

(21) Appl. No.: 17/724,534

(22) Filed: Apr. 20, 2022

(65) Prior Publication Data

US 2023/0215138 A1 Jul. 6, 2023

(51) Int. Cl.
*G06V 10/764* (2022.01)
*G06V 10/46* (2022.01)
*G06V 10/778* (2022.01)

(52) U.S. Cl.
CPC ............ *G06V 10/764* (2022.01); *G06V 10/46* (2022.01); *G06V 10/7784* (2022.01)

(58) Field of Classification Search
CPC .. G06V 10/764; G06V 10/46; G06V 10/7784; G06V 10/426
See application file for complete search history.

(56) References Cited

U.S. PATENT DOCUMENTS

| 5,912,986 | A | * | 6/1999 | Shustorovich | G06V 30/146 382/156 |
| 5,999,188 | A | * | 12/1999 | Kumar | G06T 17/20 345/643 |
| 6,151,031 | A | * | 11/2000 | Atkins | G06Q 10/10 345/441 |

(Continued)

FOREIGN PATENT DOCUMENTS

| EP | 2126849 B1 | 12/2014 |
| EP | 2750107 B1 | 3/2017 |
| WO | 2009027793 A1 | 3/2009 |

OTHER PUBLICATIONS

Indiacadworks, Applications of Artificial Intelligence in CAD Technology, Mar. 31, 2015.

(Continued)

*Primary Examiner* — Motilewa Good-Johnson

(57) ABSTRACT

The invention relates to method and system for classifying faces of a Boundary Representation (B-Rep) model using Artificial Intelligence (AI). The method includes extracting topological information corresponding to each of a plurality of data points of a B-Rep model of a product; determining a set of parameters based on the topological information corresponding to each of the plurality of data points; transforming the set of parameters corresponding to each of the plurality of data points of the B-Rep model into a tabular format to obtain a parametric data table; and assigning each of the plurality of faces of the B-Rep model a category from a plurality of categories based on the parametric data table using an AI model.

20 Claims, 10 Drawing Sheets

(56) References Cited

U.S. PATENT DOCUMENTS

| | | | | |
|---|---|---|---|---|
| 6,323,863 | B1* | 11/2001 | Shinagawa | G06V 10/426 |
| | | | | 345/473 |
| 10,338,565 | B1* | 7/2019 | Coffman | G05B 19/4097 |
| 10,706,186 | B2* | 7/2020 | Marini | G06F 30/17 |
| 2016/0275414 | A1* | 9/2016 | Towal | G06F 18/214 |
| 2023/0055488 | A1* | 2/2023 | Ojha | B29C 64/386 |
| 2023/0215138 | A1* | 7/2023 | Chandankar | G06V 10/764 |
| | | | | 345/420 |
| 2023/0222531 | A1* | 7/2023 | Cella | G06Q 10/06375 |
| | | | | 705/7.31 |

OTHER PUBLICATIONS

Nefi Alarcon, AI Helps Predict and Sketch Computer-Aided Design Models, Tags: Computer Aided Design (CAD), featured, News, Jul. 23, 2020.

* cited by examiner

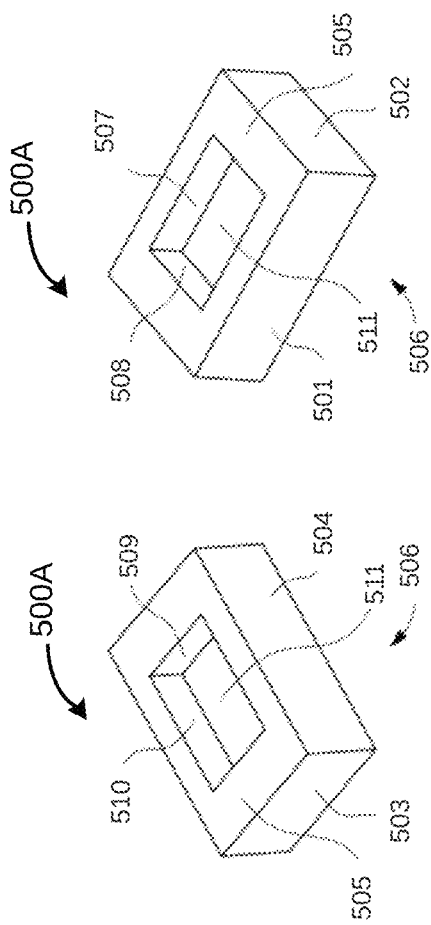
FIG. 5A
FIG. 5B
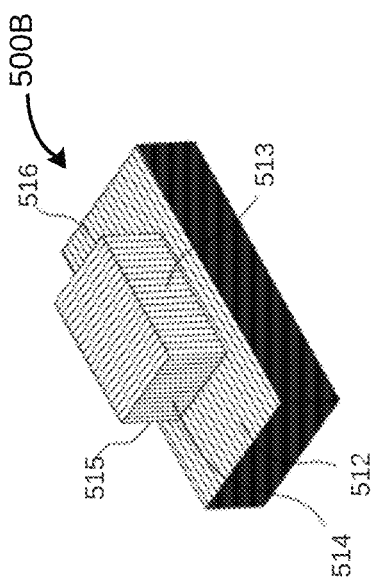
FIG. 5C

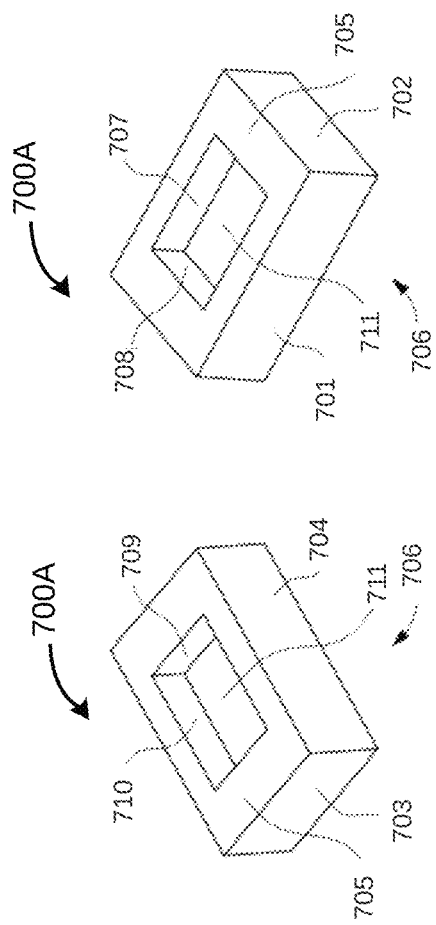
FIG. 7A
FIG. 7B
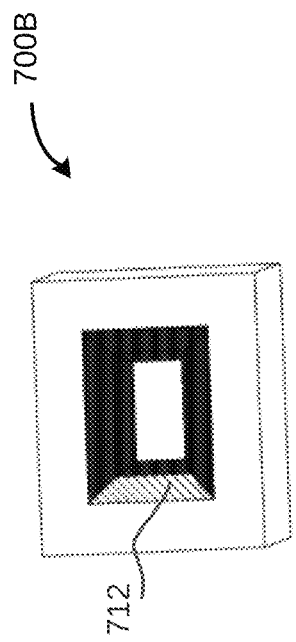
FIG. 7C

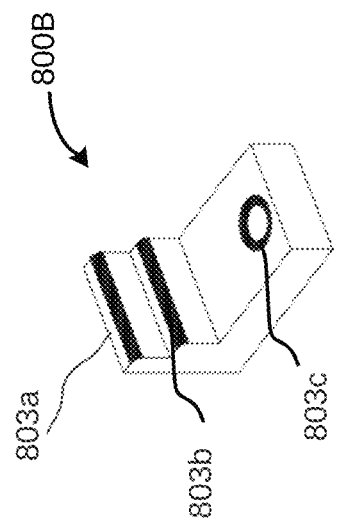
FIG. 8C
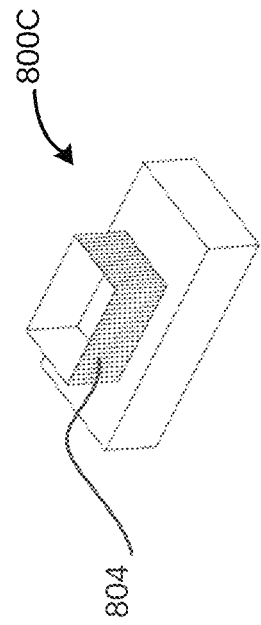
FIG. 8D
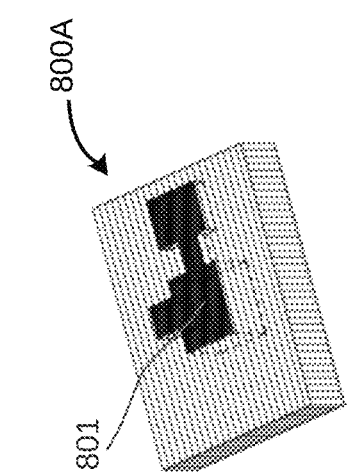
FIG. 8A
FIG. 8B

| Face Number 902 | 1 | 2 | 3 | 4 | 5 |
|---|---|---|---|---|---|
| Surface Type 903 | 0.00 | 0.00 | 1.00 | 3.00 | 1.00 |
| Edge Convexity 904 | -1.00 | 1.00 | 0.50 | 0.00 | 0.50 |
| Internal Edge Convexity 905 | 0.00 | 0.00 | 0.00 | 0.00 | 0.00 |
| Internal Loop Information 906 | 0 | 0 | 0 | 0 | 0 |
| Surface Convexity 907 | 0.00 | 0.00 | 1.00 | 1.00 | 1.00 |
| First Order Edge Convexity 908 | -1.00 | 0.50 | 0.33 | 0.08 | 0.33 |
| First Order Surface Convexity 909 | 0.00 | 0.50 | -0.17 | -0.17 | -0.17 |
| Second Order Edge Convexity 910 | -0.11 | 0.00 | 0.19 | -0.17 | 0.19 |
| Second Order Surface Convexity 911 | 0.00 | 0.00 | 0.13 | 0.08 | 0.13 |
| Area Ratio 912 | 0.28 | 0.27 | 0.01 | 0.01 | 0.01 |
| Smooth Connection Count 913 | 0 | 0 | 3 | 4 | 3 |

METHOD AND SYSTEM FOR CLASSIFYING FACES OF BOUNDARY REPRESENTATION (B-REP) MODELS USING ARTIFICIAL INTELLIGENCE

TECHNICAL FIELD

Generally, the invention relates to Boundary Representation (B-Rep) models. More specifically, the invention relates to a method and system for classifying faces of a B-Rep model using Artificial Intelligence (AI).

BACKGROUND

Typically, a Boundary representation (B-Rep) model of a mechanical part includes faces, edges, and vertices. The faces, the edges, and the vertices may be connected to form a topological structure of the mechanical part. Information of the B-Rep model of the mechanical part may be stored in a graph structure. In the graph structure, each node represents a face and each link/connection represents an edge. This type of representation helps in evaluating properties of the mechanical part. The properties may include mass, volume, moment of inertia, and the like. Additionally, such B-Rep models enable computer-based analysis of stress and strains in the mechanical part under different loading conditions. Further, a B-rep based computer model may also be cut and examined in a manner like an actual part. Therefore, the B-rep model of the mechanical part is known as a Solid model.

Today, various software based on solid modeling are widely used by engineers to create models of the mechanical parts that are intended to eventually be manufactured. Examples of the software may include SOLIDWorks and Catia (Dassault Systems), Creo Parametric (PTC), and the like.

Further, classification of faces depends on the connectivity information with the other faces. Also, a B-Rep model is a graph data structure, where each node is a face and each link is an edge between the faces. It may not be possible to pass the B-Rep model directly to Machine Learning (ML) algorithms. Thus, there is need of a system and method that transforms B-Rep data into tabular format which may be further passed to supervised learning algorithms for face classification.

SUMMARY

In one embodiment, a method for classifying faces of a Boundary Representation (B-Rep) model using Artificial Intelligence (AI) is disclosed. The method may include extracting topological information corresponding to each of a plurality of data points of a B-Rep model of a product. The B-Rep model may include a plurality of faces, a plurality of edges, and a plurality of vertices. The method may further include determining a set of parameters based on the topological information corresponding to each of the plurality of data points. It should be noted that the set of parameters includes a set of surface parameters, a set of edge parameters, and a set of connectivity parameters. The method may further include transforming the set of parameters corresponding to each of the plurality of data points of the B-Rep model into a tabular format to obtain a parametric data table. The method may further include assigning each of the plurality of faces of the B-Rep model a category from a plurality of categories based on the parametric data table using an AI model. The AI model may be based on a supervised learning algorithm.

In another embodiment, a system for classifying faces of a B-Rep model using AI is disclosed. The system may include a processor and a memory communicatively coupled to the processor extract topological information corresponding to each of a plurality of data points of a B-Rep model of a product. The B-Rep model comprises a plurality of faces, a plurality of edges, and a plurality of vertices. The processor-executable instructions, on execution, may further cause the processor to determine a set of parameters based on the topological information corresponding to each of the plurality of data points. The set of parameters includes a set of surface parameters, a set of edge parameters, and a set of connectivity parameters. The processor-executable instructions, on execution, may further cause the processor to transform the set of parameters corresponding to each of the plurality of data points of the B-Rep model into a tabular format to obtain a parametric data table. The processor-executable instructions, on execution, may further cause the processor to assign each of the plurality of faces of the B-Rep model a category from a plurality of categories based on the parametric data table using an AI model. It should be noted that the AI model may be based on a supervised learning algorithm.

In yet another embodiment, a non-transitory computer-readable medium storing computer-executable instruction for classifying faces of a B-Rep model using AI is disclosed. The stored instructions, when executed by a processor, may cause the processor to perform operations including extracting topological information corresponding to each of a plurality of data points of a B-Rep model of a product. The B-Rep model may include a plurality of faces, a plurality of edges, and a plurality of vertices The operations may further include determining a set of parameters based on the topological information corresponding to each of the plurality of data points. The set of parameters may include a set of surface parameters, a set of edge parameters, and a set of connectivity parameters The operations may further include transforming the set of parameters corresponding to each of the plurality of data points of the B-Rep model into a tabular format to obtain a parametric data table. The operations may further include assigning each of the plurality of faces of the B-Rep model a category from a plurality of categories based on the parametric data table using an AI model. It should be noted that AI model may be based on a supervised learning algorithm.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIGS. 5A-C illustrate an exemplary B-Rep model for determining various parameters for depression and protrusion faces, in accordance with some embodiments of the present disclosure.

FIGS. 7A-C illustrate an exemplary B-Rep model for determining various parameters for fillet faces, in accordance with some embodiments of the present disclosure.

FIGS. 8A-D illustrate various categories of faces for an exemplary B-Rep model, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions). Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
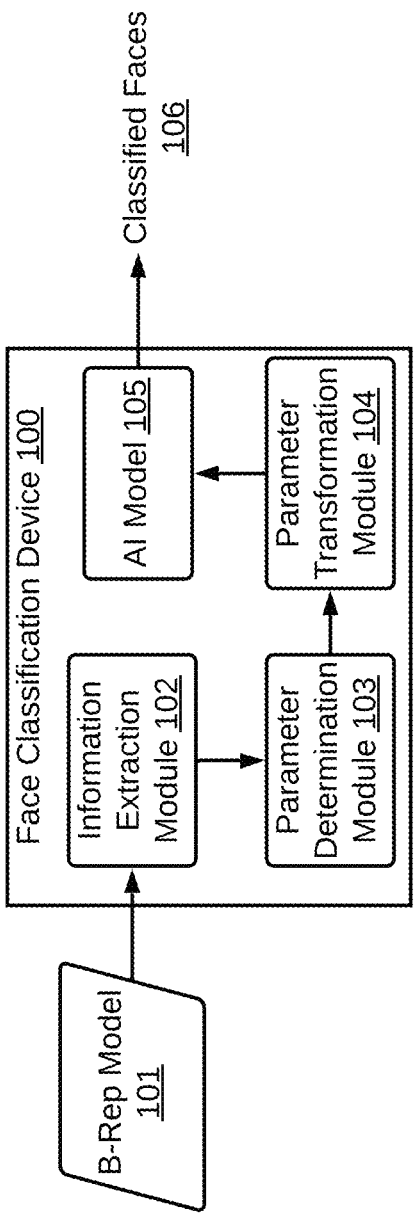
FIG. 1 illustrates a face classification device configured for classifying faces of a Boundary Representation (B-Rep) model using Artificial Intelligence (AI), in accordance with some embodiments of the present disclosure.

Referring now to FIG. 1, a face classification device 100 configured for classifying faces of a Boundary Representation (B-Rep) model 101 using Artificial Intelligence (AI) is illustrated, in accordance with some embodiments of the present disclosure. In some embodiments, the face classification device 100 may include an information extraction module 102, a parameter determination module 103, a parameter transformation module 104, and an AI Model 105. Further, the face classification device 100 may also include a data store (not shown in FIG. 1) in order to store intermediate results generated by the modules 102-105.

The information extraction module 102 may be configured to extract topological information of the B-Rep model 101 of a product. The topological information may be corresponding to each of a plurality of data points of the B-Rep model 101 of a product. It should be noted that the topological information may be stored in a graph structure. The graph structure may include a plurality of nodes corresponding to the plurality of faces of the product and a plurality of links corresponding to the plurality of edges of the product.

Also, it should be noted that the B-Rep model 101 may include a plurality of faces, a plurality of edges, and a plurality of vertices. Further, the information extraction module 102 may be communicatively connected to the parameter determination module 103 to transfer extracted information to the parameter determination module 103.

The parameter determination module 103 may be configured to receive the topological information extracted by the information extraction module 102. Further, the parameter determination module 103 may be configured to determine a set of parameters based on the topological information corresponding to each of the plurality of data points. For example, the set of parameters may include a set of surface parameters, a set of edge parameters, and a set of connectivity parameters. Parameter determination for different categories of faces is explained further in conjunction with FIGS. 4-7. The parameter determination module 103 may be operatively coupled to the parameter transformation module 104.

The set of surface parameters may include at least one of a surface type, a surface convexity, and an area ratio. The set of edge parameters may include at least one of an edge convexity, a total external edge convexity, and an internal edge convexity. The set of connectivity parameters may include at least one of a first order adjacent surface convexity, a second order adjacent surface convexity, a first order adjacent edge convexity, a second order adjacent edge convexity, an internal loop information, and a smooth connections count.

The parameter transformation module 104 may be configured for transforming the set of parameters corresponding to each of the plurality of data points of the B-Rep model into a tabular format. As a result, a parametric data table may be obtained. Further, parameter transformation module 104 may be communicatively coupled to the AI model 105.

The AI model 105 may assign a category from a plurality of categories to each of the plurality of faces of the B-Rep model based on the parametric data table. The plurality of categories may include, but is not limited to, a depression face, a protrusion face, a boss/island face, and a fillet face. Various categories for faces may be explained further in conjunction with FIG. 3. In some embodiments, it should be noted that the AI model 105 may use a supervised learning algorithm. It should be noted that the AI model may be trained based on the set of parameters corresponding to each of a plurality of training B-Rep models in a training dataset.

And, the training dataset may be in a tabular format. In some embodiments, the manufacturing features of the product may be determined based on the assigned category for each of the plurality of faces of the product.

It should be noted that the face classification device 100 may be implemented in programmable hardware devices such as programmable gate arrays, programmable array logic, programmable logic devices, or the like. Alternatively, the face classification device 100 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for automatic data security and loss protection. For example, the exemplary face classification device 100 may classify faces of a B-Rep model, by the process discussed herein. In particular, as will be appreciated by those of ordinary skill in the art, control logic and/or automated routines for performing the techniques and steps described herein may be implemented by the face classification device 100 either by hardware, software, or combinations of hardware and software. For example, suitable code may be accessed and executed by the one or more processors on the face classification 100 to perform some or all of the techniques described herein. Similarly, application specific integrated circuits (ASICs) configured to perform some or all the processes described herein may be included in the one or more processors on the system 100.

Figure 2:
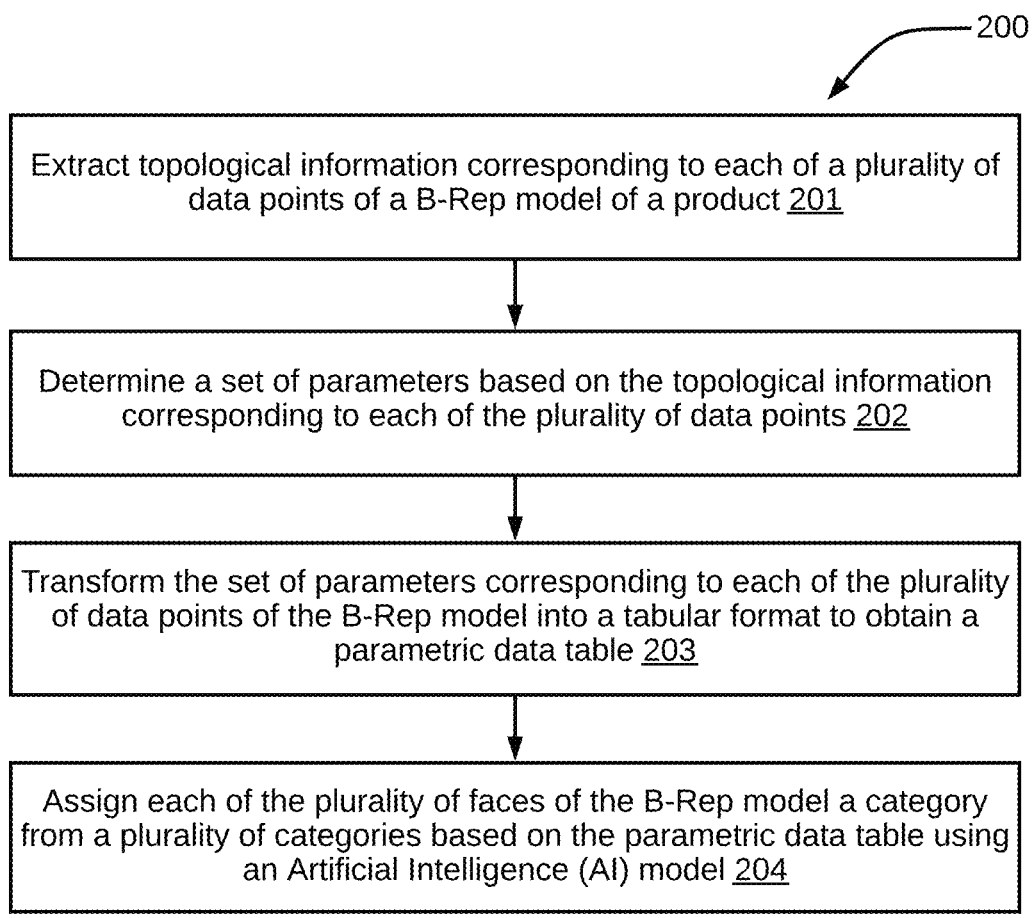
FIG. 2 illustrates a flow diagram of an exemplary process for classifying faces of a B-Rep model using AI, in accordance with some embodiments of the present disclosure.

Referring now to FIG. 2, an exemplary process for classifying faces of a B-Rep model using AI is depicted via a flow diagram, in accordance with some embodiments of the present disclosure. Each step of the process may be performed by a face classification device (similar to the face classification device 100). FIG. 2 is explained in conjunction with FIG. 1.

At step 201, topological information corresponding to each of a plurality of data points of a B-Rep model (same as the B-Rep model 102) of a product may be extracted. To extract the topological information, the face classification device 100 may employ an information extraction module (same as the information extraction module 102). Here, the B-Rep model may include a plurality of faces, a plurality of edges, and a plurality of vertices. The topological information may be stored in a graph structure. And, the graph structure includes a plurality of nodes corresponding to the plurality of faces of the product and a plurality of links corresponding to the plurality of edges of the product.

At step 202, a set of parameters may be determined using a parameter determination module (analogous to the parameter determination module 103). To determine the set of parameter, the topological information corresponding to each of the plurality of data points may be considered. It should be noted that the set of parameters may include a set of surface parameters, a set of edge parameters, and a set of connectivity parameters. In detail, the set of surface parameters may include at least one of a surface type, a surface convexity, and an area ratio, and the set of edge parameters may include at least one of an edge convexity, a total external edge convexity, and an internal edge convexity. Further, the set of connectivity parameters may include at least one of a first order adjacent surface convexity, a second order adjacent surface convexity, a first order adjacent edge convexity, a second order adjacent edge convexity, an internal loop information, and a smooth connections count.

At step 203, the set of parameters corresponding to each of the plurality of data points of the B-Rep model may be transformed into a tabular format to obtain a parametric data table using a parameter transformation module (such as, the parameter transformation module 104), which has been explained in conjunction with FIG. 1. As a result of transformation, a parametric data table may be obtained.

Thereafter, at step 204, a category from a plurality of categories may be assigned to each of the plurality of faces of the B-Rep model. For assigning the category, the parametric data table may be used. The plurality of categories may include, but is not limited to, a depression face, a protrusion face, a boss/island face, and a fillet face.

Further, to assign the category, an AI model (similar to the AI model 105) may be used. It should be noted that, in some embodiments, an AI model based on a supervised learning algorithm may be used. Also it should be noted that the AI model may be trained based on the set of parameters corresponding to each of a plurality of training B-Rep models in a training dataset. Here, the training dataset used to train the AI model may be in a tabular format. Additionally, in some embodiments, manufacturing features of the product may be determined based on the assigned category for each of the plurality of faces of the product.

Figure 3A:
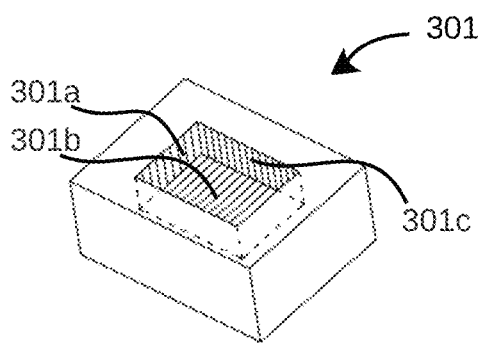
FIGS. 3A-D illustrate various categories of faces for an exemplary B-Rep model, in accordance with some embodiments of the present disclosure.
Figure 3B:
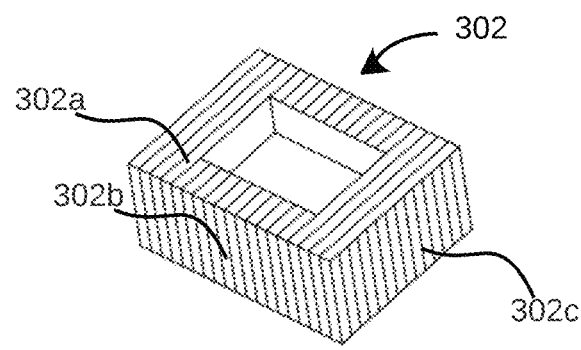

Referring now to FIGS. 3A-D, various categories of faces for exemplary B-Rep models 301, 302, 303, and 304 are illustrated, in accordance with some embodiments of the present disclosure. The B-Rep model 301 includes depression faces 301a, 301b, and 301c. As illustrated in FIG. 3A, shaded area using lines represents the depression face category for the B-Rep model 301. There may be other depression faces in the B-Rep model 301 which may not be visible in this particular view of the B-Rep model 301. It should be noted that, in this category, faces corresponding to the material may be removed by machining operations from the stock. Further, in FIG. 3B, shaded area may represent protrusion face category for the B-Rep model 302. In the B-Rep model 302, protrusion faces may be 302a, 302b, and 302c. There may other protrusion faces in the B-Rep model 302 which may not be visible in this particular view of the B-Rep model 302. It should be noted that outer stalk faces and the faces which helps in distinguishing between depression faces may be the protrusion faces 302a, 302b, and 302c.

Figure 3C:
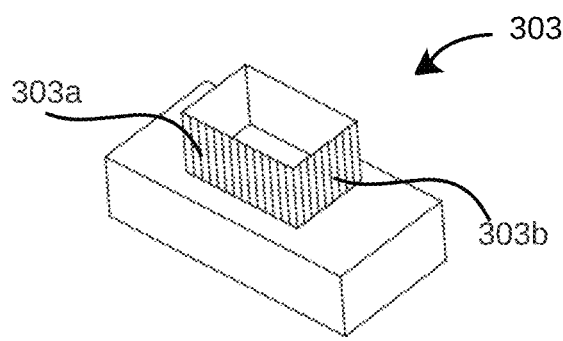
Figure 3D:
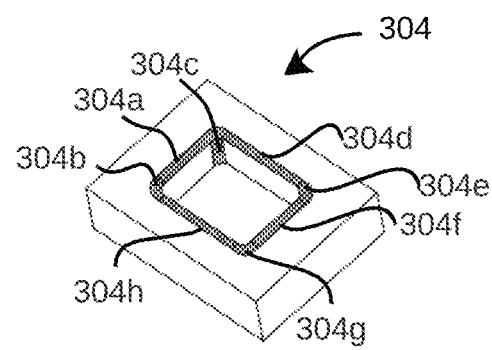

Referring to FIG. 3C, faces 303a and 303b represents boss/island faces for the B-Rep model 303. There may be two more boss/island faces for the B-Rep model 303 which are not shown in FIG. 3C. It may be apparent to a person skilled in the art that a stand-alone protruding feature on a base may be a boss/island and the faces which are part of boss/island may be boss/island faces. FIG. 3D includes a plurality of fillet faces. For example, the fillet faces 304a-304h. It should be noted that shaded area in FIG. 3D represents fillet face category. Also, it may be apparent to a person skilled in the art that faces introduced to smoothen sharp edges in a B-Rep model may be referred to as fillet faces.

Figure 4A:
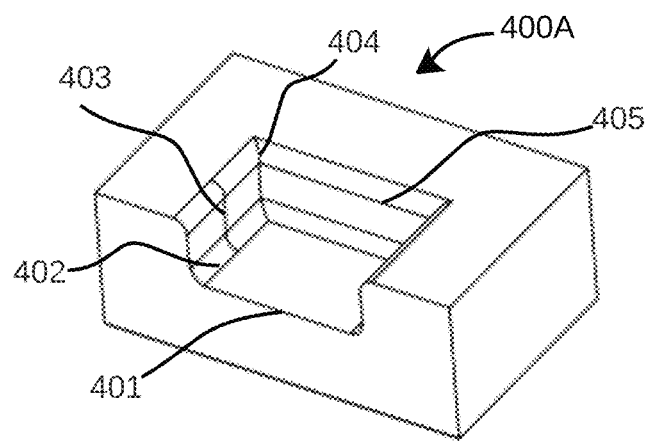
FIGS. 4A and 4B illustrate edge convexity and surface convexity of exemplary B-Rep models, in accordance with some embodiments of the present disclosure.
Figure 4B:
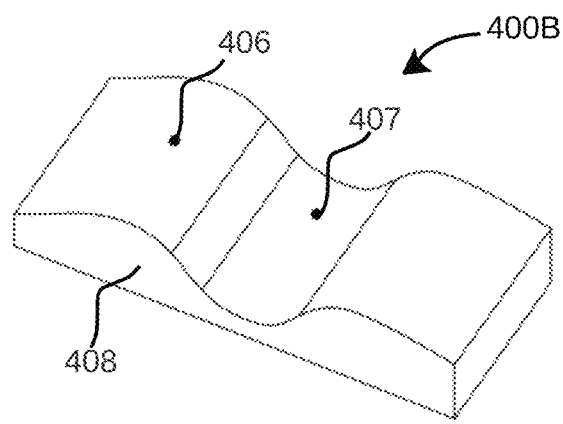

Referring now to FIGS. 4A and 4B, edge convexity and surface convexity of exemplary B-Rep models 400A and 400B are illustrated, in accordance with some embodiments of the present disclosure. It should be noted that there may be various surface types in a B-Rep model including a plane surface type, a cone surface type, a sphere surface type, a torus surface type, a spline surface type, an undefined surface type. Further, each of the surface type may have a corresponding numerical value. By way of an example, enumeration corresponding to a plane surface may be '0', for a cone surface may be '1', for a sphere surface may be '2', for a torus surface may be '3', for a spline surface may be '4', and for the undefined surface may be '5'.

As shown in FIG. 4A, the B-Rep model 400A includes various edges. Each edge in the B-Rep model 400A may be shared between two faces. Further, based on the connectivity of faces, the edges may be classified into various categories. Some of the edges are represented by reference numerals. For example, a convex edge 401, a concave smooth edge 402, a smooth edge 403, a concave edge 404, a convex smooth edge 405. By way of an example, a value '−1' may be assigned to a convex edge or a convex smooth edge. A value '0' may be assigned to a smooth edge. And, a value '1' may be assigned for concave or concave smooth edge. Further, in FIG. 4B, the B-Rep model 400B includes a convex surface 406, a concave surface 407, and a plane surface 408. Enumeration corresponding to the convex surface or convex smooth surface may be '−1', corresponding to undefined or plane surface may be '0', concave surface or concave smooth surface may be '1'.

Referring now to FIGS. 5A-C, exemplary B-Rep models 500A and 500B for determining various parameters for depression and protrusion faces are illustrated, in accordance with some embodiments of the present disclosure. The parameters may include, but are not limited to, a surface type, a total edge convexity, a total surface convexity, a first order adjacent edge convexity, a first order adjacent surface convexity, a second order adjacent edge convexity, a second order adjacent surface convexity, and a total internal edge convexity. There may be various types of surfaces, such as a plane surface, a conical surface, a spherical surface, a torus surface, a spline surface, and an undefined surface, and respective values may be '0', '1', '2', '3', '4', and '5'.

FIG. 5A represents faces 503, 505, 504, 506, 509, 510, and 511 of the B-Rep model 500A. Similarly, FIG. 5B represents faces 501, 502, 505, 506, 507, 508, and 511 of the B-Rep model 500A. For example, in the B-Rep model 500A, faces 501-504 are side faces, face 505 is a top face, 506 is a bottom face, 507-510 are vertical depression faces, and 511 is a depression bottom face. Total external edge convexity may be calculated as per equation 1, given below:

$$\text{Total external edge convexity} = \Sigma\text{Edge convexity of external edges/Total number of external edges} \quad (1)$$

In the B-Rep model 500A, for the face 511, all four edges are concave. Therefore, total external edge convexity based on equation (1) is '1' (i.e., (1+1+1+1)/4=1). Similarly, for face 509, three concave edges and one convex edge are present. Thus, total external edge convexity is 0.5 (i.e., (1+1+1−1)/4=0.5).

Further, total surface convexity may be determined as per equation (2), given below:

$$\text{Total surface convexity} = \Sigma\text{ Surface convexity at a point/Total number of points on surface} \quad (2)$$

Here, for the face 511, total three points may be considered by taking the UV parameters on the surface (first quartile, median, and third quartile of UV bounds). Therefore, the total surface convexity at the three points is '0', i.e., total surface convexity=(0+0+0)/3=0.

Further, the parameters including the first order adjacent edge convexity, the first order adjacent surface convexity, the second order adjacent edge convexity, the second order adjacent surface convexity, and the total internal edge convexity may be calculated as per equations, given below:

$$\text{First order adjacent edge convexity} = \Sigma\text{ Total external edge convexity of first order adjacent faces}/\Sigma\text{ Number of first order adjacent faces} \quad (3)$$

$$\text{First order adjacent surface convexity} = \Sigma\text{ Total surface convexity of first order adjacent faces}/\Sigma\text{ Number of first order adjacent faces} \quad (4)$$

$$\text{Second order adjacent edge convexity} = \Sigma\text{ Total external edge convexity of second order adjacent faces}/\Sigma\text{ Number of second order adjacent faces} \quad (5)$$

$$\text{Second order adjacent surface convexity} = \Sigma\text{ Total surface convexity of second order adjacent faces}/\Sigma\text{ Number of second order adjacent faces} \quad (6)$$

$$\text{Total internal edge convexity} = \Sigma\text{ Edge convexity of internal edges}/\Sigma\text{ Number of internal edges} \quad (7)$$

For the face 511, $1^{st}$ order adjacent faces are 507, 508, 509, and 510. Based on equation (1), total external edge convexity for each of the faces 507, 508, 509, and 510, is 0.75. Thus, the first order adjacent edge convexity for the face 511 based on equation (3) may be 0.5 (i.e., (0.5+0.5+0.5+0.5)/4). Further, based on equation (2), total surface convexity for each of the faces 507, 508, 509, and 510, is '0'. Thus, the first order surface convexity for the face 511 based on equation (4) may be 0 (i.e., 0+0+0+0)/4).

For face 511, second order face is 505 and total external edge convexity calculated for the face 505 as per equation (1) is '−1'. Thus, second order adjacent edge convexity based on equation (5) for the face 511 may be '−1', (i.e., −1/1=−1). Total surface convexity for the face 505 as per equation (2) is '0'. Therefore, second order surface convexity based on equation (6) for the face 511 may be 0 (i.e., =0/1=0).

Further, the B-rep model 500B includes faces 512-516. For the face 512, all four internal edges are concave. Thus, values corresponding to each of the edge is '1'. Moreover, total internal edge convexity as per equation (7) for the face 512 may be 1 (i.e., (1+1+1+1)/4=1).

Figure 6:
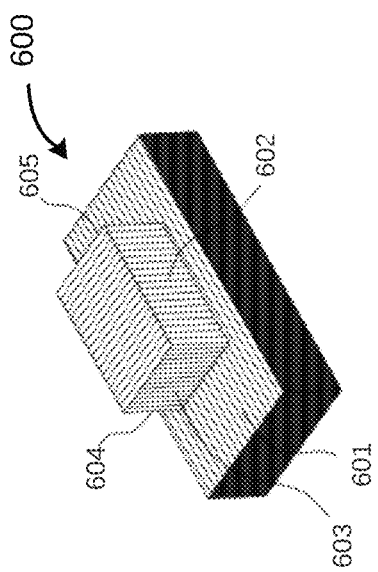
FIG. 6 illustrates an exemplary B-Rep model for determining internal loop information for island or boss faces, in accordance with some embodiments of the present disclosure.

Referring now to FIG. 6, an exemplary B-Rep model 600 for determining internal loop information for island or boss faces is illustrated, in accordance with some embodiments of the present disclosure. The B-Rep model 600 includes various faces, such as faces 601-605. Further, the internal loop information for the island or boss faces may be calculated as per equation given below:

$$\text{Internal loop information} = \text{Number of external edges of a face which are on the internal loop of the partner face of that edge} \quad (8)$$

In the exemplary B-Rep model 600, for the face 602, there is one edge on the internal loop of the face 601 (partner face), therefore, value for the parameter internal loop information may be '1'.

Referring now to FIG. 7A-7C, exemplary B-Rep models 700A and 700B for determining various parameters for fillet faces are illustrated, in accordance with some embodiments of the present disclosure. FIG. 7A represents faces 703, 704, 705, 706, 709, 710, and 711 of the B-Rep model 700A. Similarly, FIG. 7B represents faces 701, 702, 705, 706, 707, 708, and 711 of the B-Rep model 700A. For example, in the B-Rep model 700A, faces 701-704 are side faces, face 705 is a top face, 706 is a bottom face, 707-710 are vertical depression faces, and 711 is a depression bottom face. In order to calculate a parameter 'area ratio' following equation (9) may be used:

$$\text{Area ratio} = \text{Area of largest face of B-Rep part} / \text{Area of face under consideration} \quad (9)$$

By way of an example, in FIGS. 7A and 7B, area of the largest face 706 may be '200 units' and area of the face 711 may be '50 units'. Therefore, for the face 711, the area ratio may be '4' (i.e., 200/50=4). Additionally, for determining a parameter smooth count for a fillet face, equation (10) may be used:

$$\text{Smooth connection count} = \text{Total number of convex or concave smooth edges of the face} \quad (10)$$

Now, referring to FIG. 7C, for a face 712, there are two smooth convex connections and two concave connections. Thus, smooth connection count for the face 712 may be '2'.

Referring now to FIGS. 8A-D, various categories of faces for exemplary B-Rep models 800A, 800B, and 800C are illustrated, in accordance with some embodiments of the present disclosure. FIG. 8A shows depression faces. For example, faces within area 801 may be the depression faces. FIG. 8B shows protrusion faces. For example, faces within area 802 may be the protrusion faces. Further, B-Rep model 800B as shown in FIG. 8C includes fillet faces 803a, 803b, and 803c. The exemplary B-Rep model 800C is shown in FIG. 8D. Faces within the area 804 may be boss/island faces.

Figure 9:
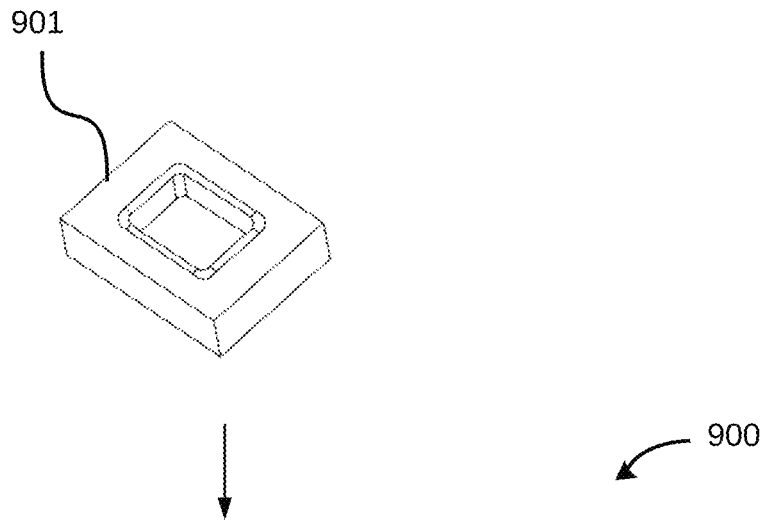
FIG. 9 illustrates an exemplary parametric data table for a set of parameters corresponding to a B-Rep model, in accordance with some embodiments of the present disclosure.

Referring now to FIG. 9, an exemplary parametric data table 900 for a set of parameters corresponding to a B-Rep model 901 is illustrated, in accordance with some embodiments of the present disclosure. The parameter transformation module 104 transforms the set of parameters corresponding to each of the plurality of data points of the B-Rep model 901 into a tabular format to obtain the parametric data table 900. The set of parameters in the parametric data table 900 may include a face number 902, a surface type 903, edge convexity 904, internal edge convexity 905, internal loop information 906, surface convexity 907, first order edge convexity 908, first order surface convexity 909, second order edge convexity 910, second order surface convexity 911, area ratio 912, and smooth connection count 913. Further, the parametric data table 900 may be used to train the AI model 105 of the face classification device 100.

Figure 10:
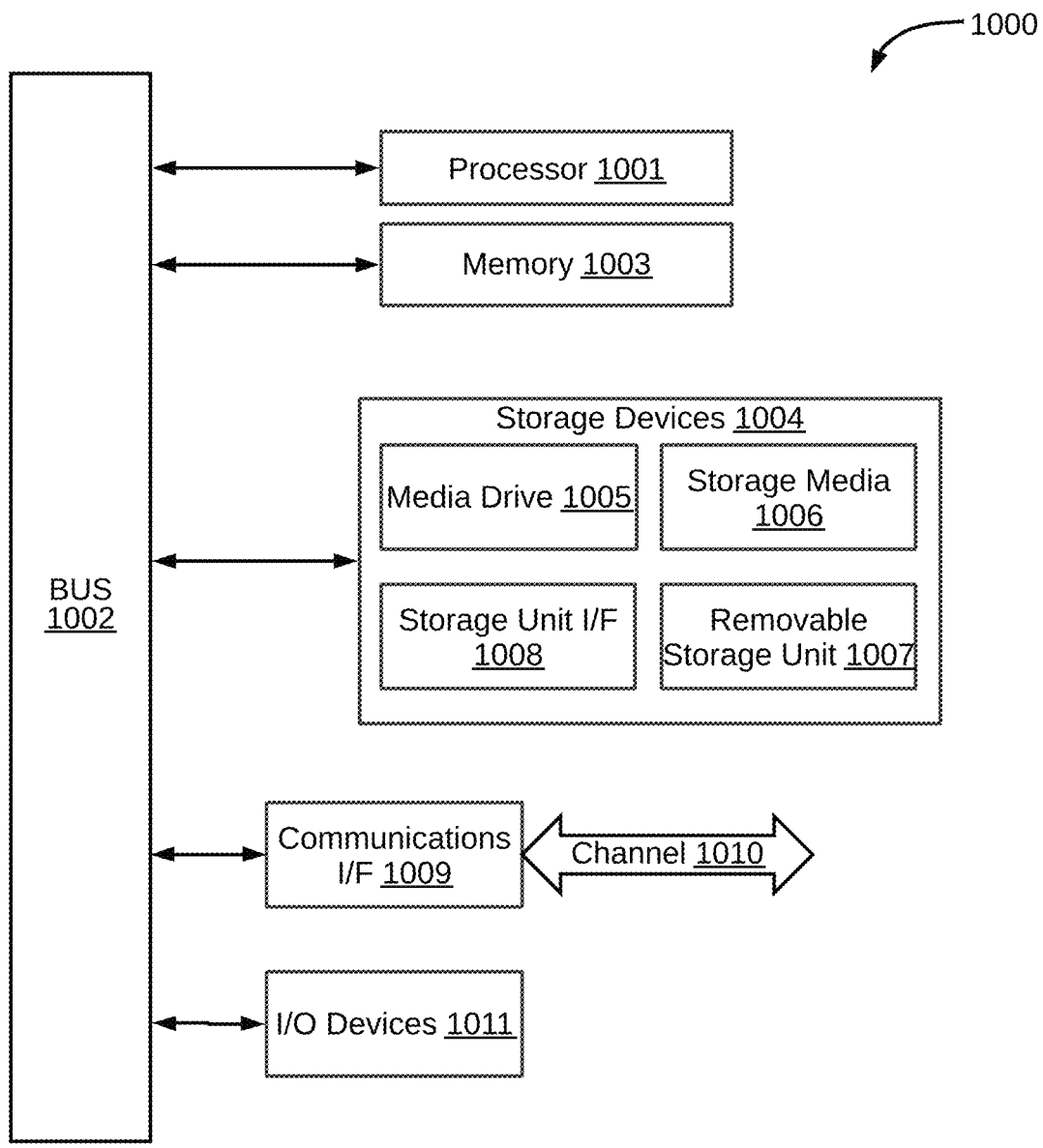
FIG. 10 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 10, an exemplary computing system 1000 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1000 may represent, for example, a user device such as a desktop, a laptop, a mobile phone, personal entertainment device, DVR, and so on, or any other type of special or general-purpose computing device as may be desirable or appropriate for a given application or environment. The computing system 1000 may include one or more processors, such as a processor 1001 that may be implemented using a general or special purpose processing engine such as, for example, a microprocessor, microcontroller or other control logic. In this example, the processor 1001 is connected to a bus 1002 or other communication medium. In some embodiments, the processor 1001 may be an AI processor, which may be implemented as a Tensor Processing Unit (TPU), or a graphical processor unit, or a custom programmable solution Field-Programmable Gate Array (FPGA).

The computing system 1000 may also include a memory 1003 (main memory), for example, Random Access Memory (RAM) or other dynamic memory, for storing information and instructions to be executed by the processor 1001. The memory 1003 also may be used for storing temporary variables or other intermediate information during execution of instructions to be executed by the processor 1001. The computing system 1000 may likewise include a read only memory ("ROM") or other static storage device coupled to bus 1002 for storing static information and instructions for the processor 1001.

The computing system 1000 may also include a storage device 1004, which may include, for example, a media drives 1005 and a removable storage interface. The media drive 1005 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1006 may include, for example, a hard disk, magnetic tape, flash drive, or other fixed or removable medium that is read by and written to by the media drive 1005. As these examples illustrate, the storage media 1006 may include a computer-readable storage medium having stored there in particular computer software or data.

In alternative embodiments, the storage devices 1004 may include other similar instrumentalities for allowing computer programs or other instructions or data to be loaded into the computing system 1000. Such instrumentalities may include, for example, a removable storage unit 1007 and a storage unit interface 1008, such as a program cartridge and cartridge interface, a removable memory (for example, a flash memory or other removable memory module) and memory slot, and other removable storage units and interfaces that allow software and data to be transferred from the removable storage unit 1007 to the computing system 1000.

The computing system 1000 may also include a communications interface 1009. The communications interface 1009 may be used to allow software and data to be transferred between the computing system 1000 and external devices. Examples of the communications interface 1009 may include a network interface (such as an Ethernet or other NIC card), a communications port (such as for example, a USB port, a micro USB port), Near field Communication (NFC), etc. Software and data transferred via the communications interface 1009 are in the form of signals which may be electronic, electromagnetic, optical, or other signals capable of being received by the communications interface 1009. These signals are provided to the communications interface 1009 via a channel 1010. The channel 1010 may carry signals and may be implemented using a wireless medium, wire or cable, fiber optics, or other communications medium. Some examples of the channel 1010 may include a phone line, a cellular phone link, an RF link, a Bluetooth link, a network interface, a local or wide area network, and other communications channels.

The computing system 1000 may further include Input/Output (I/O) devices 1011. Examples may include, but are not limited to a display, keypad, microphone, audio speakers, vibrating motor, LED lights, etc. The I/O devices 1011 may receive input from a user and also display an output of the computation performed by the processor 1001. In this document, the terms "computer program product" and "computer-readable medium" may be used generally to refer to media such as, for example, the memory 1003, the storage devices 1004, the removable storage unit 1007, or signal(s) on the channel 1010. These and other forms of computer-readable media may be involved in providing one or more sequences of one or more instructions to the processor 1001 for execution. Such instructions, generally referred to as "computer program code" (which may be grouped in the form of computer programs or other groupings), when executed, enable the computing system 1000 to perform features or functions of embodiments of the present invention.

In an embodiment where the elements are implemented using software, the software may be stored in a computer-readable medium and loaded into the computing system 1000 using, for example, the removable storage unit 1007, the media drive 1005 or the communications interface 1009. The control logic (in this example, software instructions or computer program code), when executed by the processor 1001, causes the processor 1001 to perform the functions of the invention as described herein.

Thus, the present disclosure may overcome drawbacks of traditional systems discussed before. The disclosed method and system in the present disclosure may capture connectivity information and properties of faces and edges stored in the graph structure of a B-Rep model and convert them into a tabular format which may be further suitable for consumption of Machine Learning (ML) algorithms. Additionally, the classified faces are utilized to identify the manufacturing features in the B-Rep part. Moreover, base parameters effectively capture topological and geometrical information in the B-Rep model. Thus, the classification categories may be extended by adding extra parameters as per requirement. The parameters provide great accuracy while using various ML algorithms. Further, to get better results, Deep Learning (DL) models may also be employed when the amount of data available is huge.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for classifying faces of a Boundary Representation (B-Rep) model using Artificial Intelligence (AI), the method comprising:
    extracting, by a face classification device, topological information corresponding to each of a plurality of data points of a B-Rep model of a product, wherein the B-Rep model comprises a plurality of faces, a plurality of edges, and a plurality of vertices;
    determining, by the face classification device, a set of parameters based on the topological information corresponding to each of the plurality of data points, wherein the set of parameters comprises a set of surface parameters, a set of edge parameters, and a set of connectivity parameters;
    transforming, by the face classification device, the set of parameters corresponding to each of the plurality of data points of the B-Rep model into a tabular format to obtain a parametric data table; and
    assigning, by the face classification device, to each of the plurality of faces of the B-Rep model, a category from a plurality of categories based on the parametric data table using an AI model, wherein the AI model is based on a supervised learning algorithm.

2. The method of claim 1, wherein:
    the set of surface parameters comprises at least one of a surface type, a surface convexity, and an area ratio;
    the set of edge parameters comprises at least one of an edge convexity, a total external edge convexity, and an internal edge convexity; and
    the set of connectivity parameters comprises at least one of a first order adjacent surface convexity, a second order adjacent surface convexity, a first order adjacent edge convexity, a second order adjacent edge convexity, an internal loop information, and a smooth connections count.

3. The method of claim 1, wherein the plurality of categories comprises a depression face, a protrusion face, a boss/island face, and a fillet face.

4. The method of claim 1, further comprising training the AI model based on the set of parameters corresponding to each of a plurality of training B-Rep models in a training dataset, wherein the training dataset is in a tabular format.

5. The method of claim 1, wherein the topological information is stored in a graph structure.

6. The method of claim 5, wherein the graph structure comprises a plurality of nodes corresponding to the plurality of faces of the product and a plurality of links corresponding to the plurality of edges of the product.

7. The method of claim 1, further comprises determining manufacturing features of the product based on the assigned category for each of the plurality of faces of the product.

8. A system for classifying faces of a B-Rep model using AI, the system comprising:
    a processor; and
    a memory communicatively coupled to the processor, wherein the memory stores processor-executable instructions, which, on execution, cause the processor to:
        extract topological information corresponding to each of a plurality of data points of a B-Rep model of a product, wherein the B-Rep model comprises a plurality of faces, a plurality of edges, and a plurality of vertices;

determine a set of parameters based on the topological information corresponding to each of the plurality of data points, wherein the set of parameters comprises a set of surface parameters, a set of edge parameters, and a set of connectivity parameters;

transform the set of parameters corresponding to each of the plurality of data points of the B-Rep model into a tabular format to obtain a parametric data table; and assign each of the plurality of faces of the B-Rep model a category from a plurality of categories based on the parametric data table using an AI model, wherein the AI model is based on a supervised learning algorithm.

9. The system of claim 8, wherein:

the set of surface parameters comprises at least one of a surface type, a surface convexity, and an area ratio;

the set of edge parameters comprises at least one of an edge convexity, a total external edge convexity, and an internal edge convexity; and the set of connectivity parameters comprises at least one of a first order adjacent surface convexity, a second order adjacent surface convexity, a first order adjacent edge convexity, a second order adjacent edge convexity, an internal loop information, and a smooth connections count.

10. The system of claim 8, wherein the plurality of categories comprises a depression face, a protrusion face, a boss/island face, and a fillet face.

11. The system of claim 8, wherein the processor-executable instructions further cause the processor to train the AI model based on the set of parameters corresponding to each of a plurality of training B-Rep models in a training dataset, wherein the training dataset is in a tabular format.

12. The system of claim 8, wherein the topological information is stored in a graph structure.

13. The system of claim 12, wherein the graph structure comprises a plurality of nodes corresponding to the plurality of faces of the product and a plurality of links corresponding to the plurality of edges of the product.

14. The system of claim 9, wherein the processor-executable instructions further cause the processor to determine manufacturing features of the product based on the assigned category for each of the plurality of faces of the product.

15. A non-transitory computer-readable medium storing computer-executable instructions for classifying faces of a B-Rep model using AI, the computer-executable instructions configured for:

extracting topological information corresponding to each of a plurality of data points of a B-Rep model of a product, wherein the B-Rep model comprises a plurality of faces, a plurality of edges, and a plurality of vertices;

determining a set of parameters based on the topological information corresponding to each of the plurality of data points, wherein the set of parameters comprises a set of surface parameters, a set of edge parameters, and a set of connectivity parameters;

transforming the set of parameters corresponding to each of the plurality of data points of the B-Rep model into a tabular format to obtain a parametric data table; and assigning each of the plurality of faces of the B-Rep model a category from a plurality of categories based on the parametric data table using an AI model, wherein the AI model is based on a supervised learning algorithm.

16. The non-transitory computer-readable medium of the claim 15, wherein:

the set of surface parameters comprises at least one of a surface type, a surface convexity, and an area ratio;

the set of edge parameters comprises at least one of an edge convexity, a total external edge convexity, and an internal edge convexity; and the set of connectivity parameters comprises at least one of a first order adjacent surface convexity, a second order adjacent surface convexity, a first order adjacent edge convexity, a second order adjacent edge convexity, an internal loop information, and a smooth connections count.

17. The non-transitory computer-readable medium of the claim 15, wherein the plurality of categories comprises a depression face, a protrusion face, a boss/island face, and a fillet face.

18. The non-transitory computer-readable medium of the claim 15, wherein the computer-executable instructions further configured for training the AI model based on the set of parameters corresponding to each of a plurality of training B-Rep models in a training dataset, wherein the training dataset is in a tabular format.

19. The non-transitory computer-readable medium of the claim 15, wherein the topological information is stored in a graph structure.

20. The non-transitory computer-readable medium of the claim 19, wherein the graph structure comprises a plurality of nodes corresponding to the plurality of faces of the product and a plurality of links corresponding to the plurality of edges of the product.

* * * * *